(12) United States Patent
Hottle

(10) Patent No.: US 6,336,530 B1
(45) Date of Patent: Jan. 8, 2002

(54) VEHICLE BRAKE ASSEMBLY

(76) Inventor: Timothy L. Hottle, P.O. Box 21312, Lehigh Valley, PA (US) 18002

( * ) Notice: Subject to any disclaimer, the term of this patent is extended or adjusted under 35 U.S.C. 154(b) by 0 days.

(21) Appl. No.: 09/544,437

(22) Filed: Apr. 7, 2000

(51) Int. Cl.[7] .............................................. F16D 55/28
(52) U.S. Cl. ...................................... 188/171; 188/161
(58) Field of Search .................................. 188/161, 162, 188/163, 171; 192/76, 79, 84.1, 84.2, 84.31, 84.8, 85 AT; 310/77, 78, 93, 103

(56) References Cited

U.S. PATENT DOCUMENTS

| | | | |
|---|---|---|---|
| 3,763,968 A | | 10/1973 | Noly |
| 4,734,604 A | | 3/1988 | Sontheimer et al. |
| 4,798,269 A | * | 1/1989 | Lindner et al. ............. 188/171 |
| 4,937,483 A | | 6/1990 | Matsui et al. |
| 5,000,523 A | | 3/1991 | Mikkaeil-Boules et al. |
| 5,154,261 A | * | 10/1992 | Tanaka et al. ............... 188/171 |
| 5,333,706 A | | 8/1994 | Mori |
| 5,433,297 A | * | 7/1995 | Kuivamaki ................. 188/71.8 |
| 5,746,294 A | | 5/1998 | Lee |
| 5,873,443 A | * | 2/1999 | Meller et al. ................. 192/76 |
| 6,125,975 A | * | 10/2000 | Seeto et al. ................. 188/171 |
| 6,237,730 B1 | * | 5/2001 | Dropmann et al. ......... 188/171 |

* cited by examiner

Primary Examiner—Christopher P. Schwartz

(57) ABSTRACT

A vehicle brake assembly for improving the brake system on vehicle without using wearable brake pads. The vehicle brake assembly includes a drum having spaced openings a bore extending through the drum. A securing means is provided for securing the drum in a vehicle. A shaft is rotatably extended through the drum. A disc brake member has a pair of sides and a centrally-disposed opening therethrough and is mounted about the shaft for rotation therewith and is disposed within the drum and has a plurality of holes extending therethrough. A braking means is provided for braking the disc brake member.

15 Claims, 3 Drawing Sheets

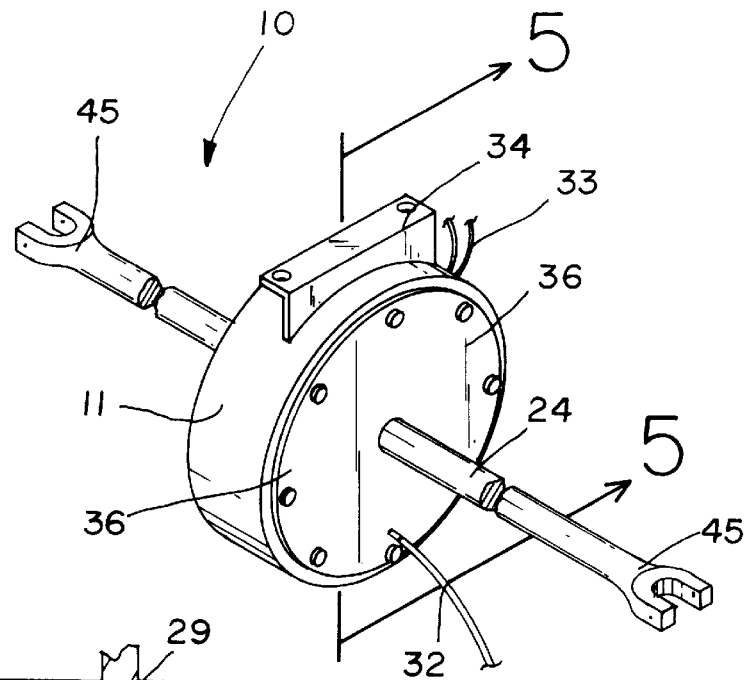
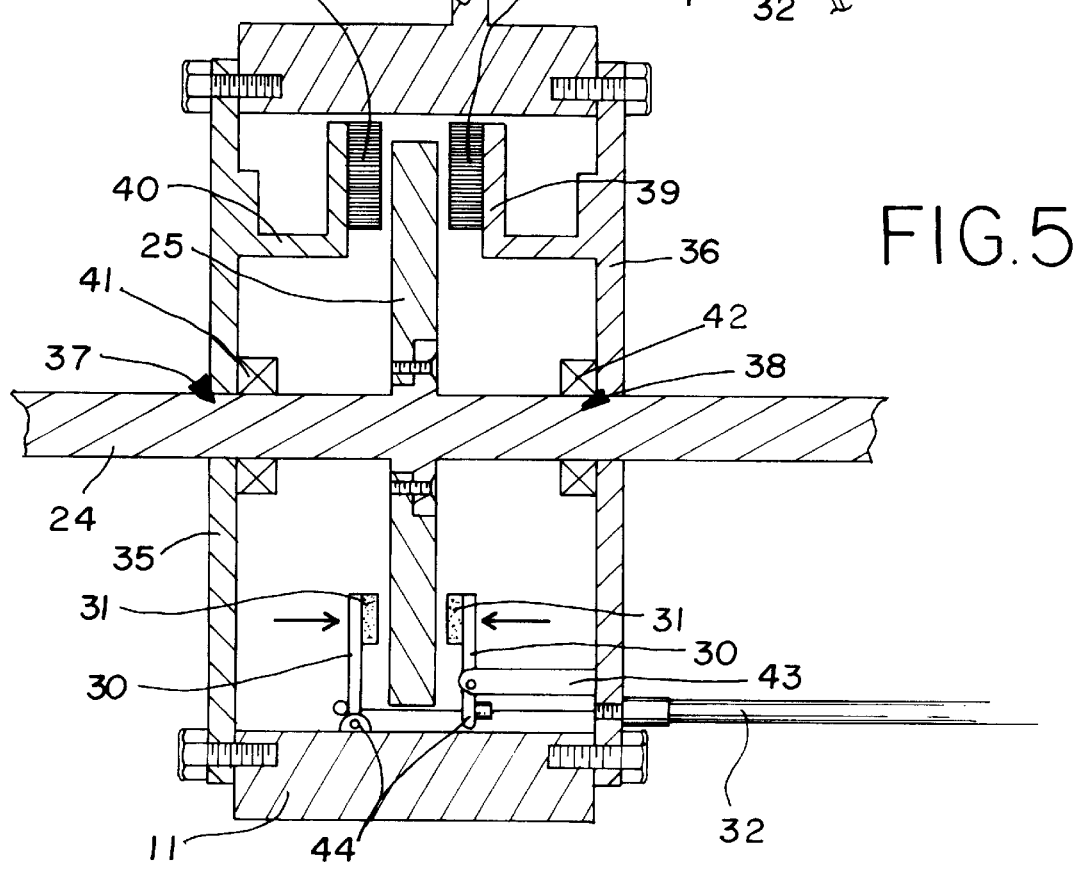

VEHICLE BRAKE ASSEMBLY

BACKGROUND OF THE INVENTION

1. Field of the Invention

The present invention relates to a frictionless brake device and more particularly pertains to a new vehicle brake assembly for improving the brake system on vehicle without using wearable brake pads.

2. Description of the Prior Art

The use of a frictionless brake device is known in the prior art. More specifically, a frictionless brake device heretofore devised and utilized are known to consist basically of familiar, expected and obvious structural configurations, not with standing the myriad of designs encompassed by the crowded prior art which have been developed for the fulfillment of countless objectives and requirements.

Known prior art includes U.S. Pat. No. 5,333,706; U.S. Pat. No. 5,746,294; U.S. Pat. No. 4,937,483; U.S. Pat. No. 5,000,523; U.S. Pat. No. 4,734,604; and U.S. Pat. No. 3,763,968.

While these devices fulfill their respective, particular objectives and requirements, the aforementioned patents do not disclose a new vehicle brake assembly. The inventive device includes a drum having spaced openings a bore extending through the drum. A securing means is provided for securing the drum in a vehicle. A shaft is rotatably extended through the drum. A disc brake member has a pair of sides and a centrally-disposed opening therethrough and is mounted about the shaft for rotation therewith and is disposed within the drum and has a plurality of holes extending therethrough. A braking means is provided for braking the disc brake member.

In these respects, the vehicle brake assembly according to the present invention substantially departs from the conventional concepts and designs of the prior art, and in so doing provides an apparatus primarily developed for the purpose of improving the brake system on vehicle without using wearable brake pads.

SUMMARY OF THE INVENTION

In view of the foregoing disadvantages inherent in the known types of frictionless brake device now present in the prior art, the present invention provides a new vehicle brake assembly construction wherein the same can be utilized for improving the brake system on vehicle without using wearable brake pads.

The general purpose of the present invention, which will be described subsequently in greater detail, is to provide a new vehicle brake assembly which has many of the advantages of the frictionless brake device mentioned heretofore and many novel features that result in a new vehicle brake assembly which is not anticipated, rendered obvious, suggested, or even implied by any of the prior art frictionless brake device, either alone or in any combination thereof.

To attain this, the present invention generally comprises a drum having spaced openings a bore extending through the drum. A securing means is provided for securing the drum in a vehicle. A shaft is rotatably extended through the drum. A disc brake member has a pair of sides and a centrally-disposed opening therethrough and is mounted about the shaft for rotation therewith and is disposed within the drum and has a plurality of holes extending therethrough. A braking means is provided for braking the disc brake member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new vehicle brake assembly which has many of the advantages of the frictionless brake device mentioned heretofore and many novel features that result in a new vehicle brake assembly which is not anticipated, rendered obvious, suggested, or even implied by any of the prior art frictionless brake device, either alone or in any combination thereof.

It is another object of the present invention to provide a new vehicle brake assembly which may be easily and efficiently manufactured and marketed.

It is a further object of the present invention to provide a new vehicle brake assembly which is of a durable and reliable construction.

An even further object of the present invention is to provide a new vehicle brake assembly which is susceptible of a low cost of manufacture with regard to both materials and labor, and which accordingly is then susceptible of low prices of sale to the consuming public, thereby making such vehicle brake assembly economically available to the buying public.

Still yet another object of the present invention is to provide a new vehicle brake assembly which provides in the apparatuses and methods of the prior art some of the advantages thereof, while simultaneously overcoming some of the disadvantages normally associated therewith.

Still another object of the present invention is to provide a new vehicle brake assembly for improving the brake system on vehicle without using wearable brake pads.

Yet another object of the present invention is to provide a new vehicle brake assembly which includes a drum having spaced openings a bore extending through the drum. A securing means is provided for securing the drum in a vehicle. A shaft is rotatably extended through the drum. A disc brake member has a pair of sides and a centrally-disposed opening therethrough and is mounted about the shaft for rotation therewith and is disposed within the drum and has a plurality of holes extending therethrough. A braking means is provided for braking the disc brake member.

Still yet another object of the present invention is to provide a new vehicle brake assembly that substantially reduces the wear and tear on the drums of the wheels of a vehicle.

Even still another object of the present invention is to provide a new vehicle brake assembly that involves little or no maintenance unlike the conventional brake systems.

These together with other objects of the invention, along with the various features of novelty which characterize the invention, 15 are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a perspective view of the second embodiment of the present invention.

FIG. 5 is cross-sectional view of the second embodiment of the present invention.

DESCRIPTION OF THE PREFERRED EMBODIMENT

Figure 1:
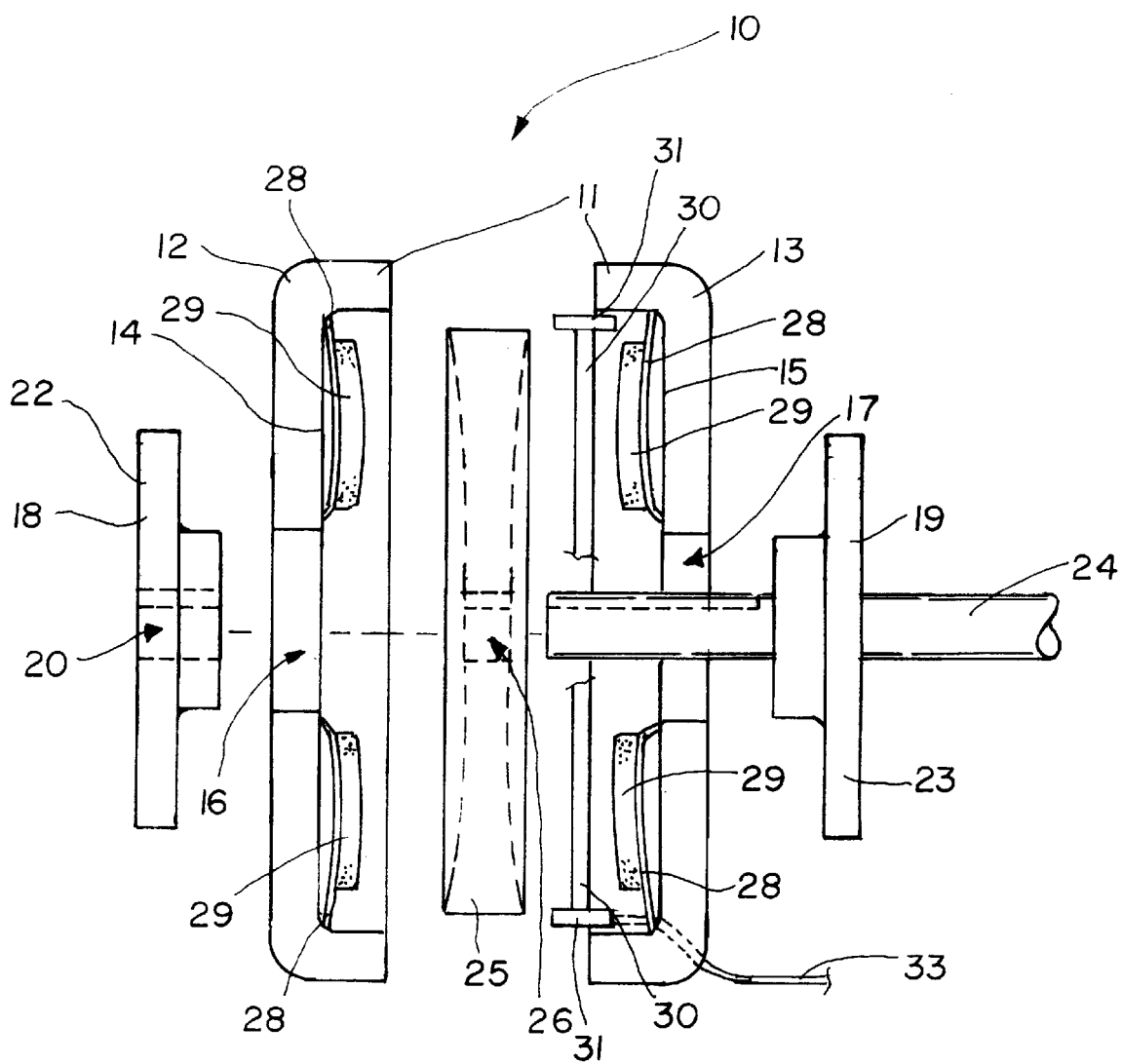
FIG. 1 is an exploded side elevational view of the first embodiment of a new vehicle brake assembly according to the present invention.
Figure 2:
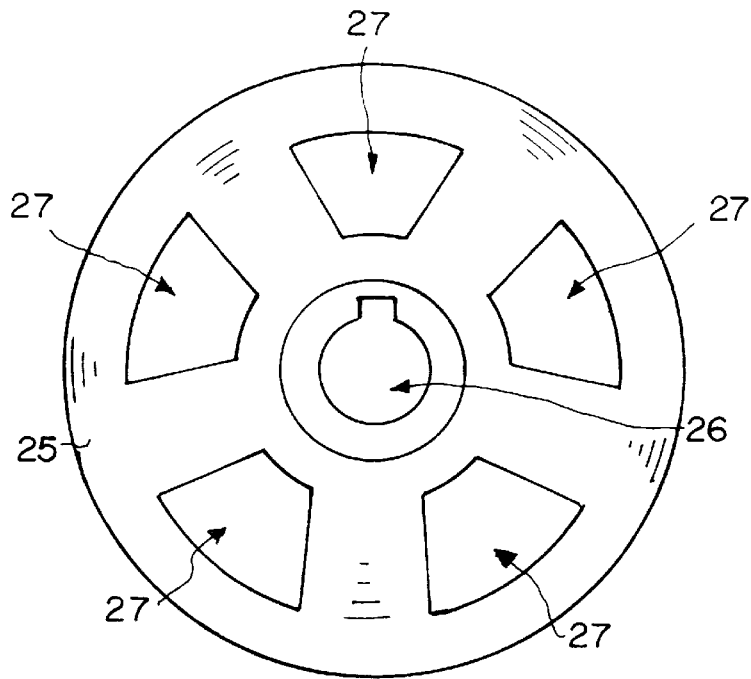
FIG. 2 is a side elevational view of disc brake member of the first embodiment of the present invention.
Figure 3:
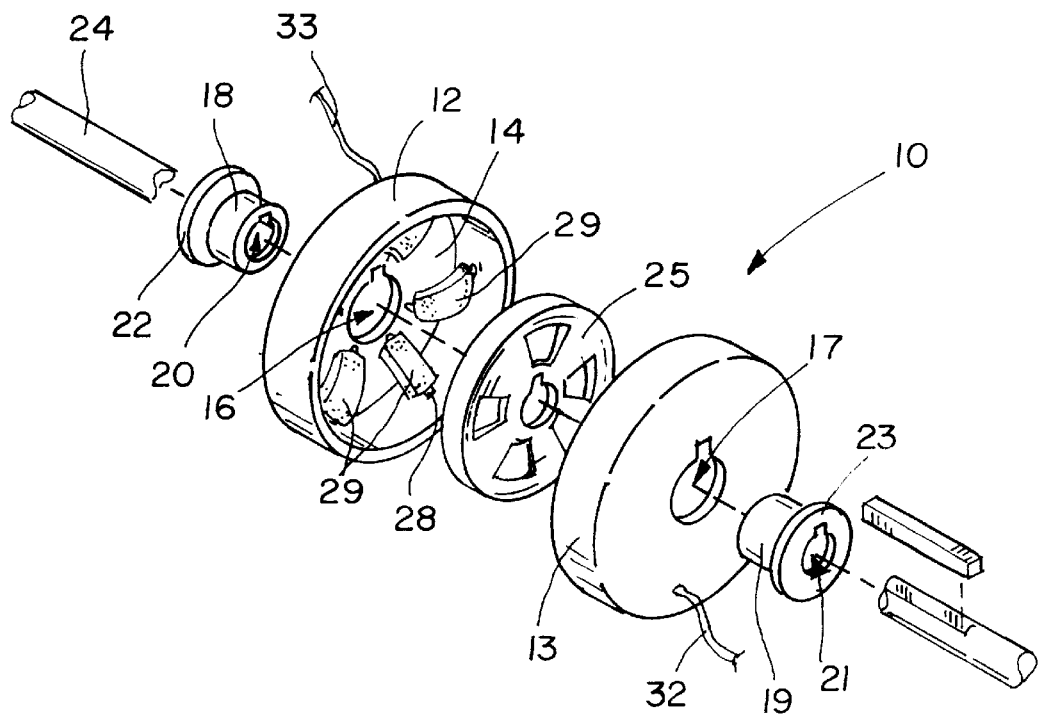
FIG. 3 is an exploded perspective view of the first embodiment of the present invention.

With reference now to the drawings, and in particular to FIGS. 1 through 5 thereof, a new vehicle brake assembly embodying the principles and concepts of the present invention and generally designated by the reference numeral 10 will be described.

As best illustrated in FIGS. 1 through 5, the vehicle brake assembly 10 generally comprises a drum 11 having spaced openings 16, 17 that define a bore that extends through the drum. The assembly further comprises a means for securing the drum 11 in a vehicle. A shaft 24 rotatably extends through the drum 11. A disc brake member 25 having a pair of sides and a centrally-disposed opening 26 therethrough is conventionally mounted about the shaft 24 for rotation therewith and is disposed within the drum 11 and has a plurality of holes 27 extending therethrough. The vehicle brake assembly 10 also includes a means for braking the disc brake member 25.

As a first embodiment, the drum 11 includes a first member 12 having a first side 14 facing the disc brake member 25 and a second member 13 also having a first side 15 facing the disc brake member 25 with the first and second members 12,13 being mirrored images of one another and with the openings 16,17 extending through the first and second members 12,13. The means for securing the drum 11 in a vehicle includes a pair of hub members 18,19 each of which includes a bore 20,21 extending therethrough and includes an annular flange 22,23 for being in contactable relationship with a respective end of the drum 11. The hub members 18,19 are conventionally mounted about the shaft 24 for holding the first and second members 12,13 in contactable relationship to one another. The means for braking the disc brake member 25 includes a plurality of mounting members 28 being securely and conventionally attached to the first sides 14,15 of the first and second members 12,13, and also includes a plurality of electro-magnetic members 29 each of which is securely and conventionally mounted to a respective one of the mounting members 28, and further includes a plurality of arm members 30 pivotally attached to one of the first sides 15 of either the first or second member 12,13, and also includes a plurality of pad members 31 each of which is securely and conventionally attached to an end of a respective one of the arm members 30 and is adapted to engage the disc brake member 25, and further includes a power cord 33 conventionally connected to the electro-magnetic members 29 for the energizing thereof, and also includes a cable 32 conventionally connected to the arm members 30 for the actuation thereof.

As a second embodiment, the means for securing the drum 11 in a vehicle includes a drum mounting bracket 34 being securely and conventionally attached to an exterior of a wall of the drum 11 for mounting the drum 11 to a vehicle. The drum mounting bracket 34 includes a first portion and a second portion which is angled relative to the first portion. The shaft 24 is adapted to securely and conventionally attach to an axle of the vehicle and includes means for securely attaching the shaft 24 to an axle of the vehicle. The means for securely attaching the shaft 24 to an axle of the vehicle includes a pair of yoked members 45 integrally attached to ends of the shaft 24. A means for braking the disc brake member 25 includes a pair of support members 35,36 each of which is securely and removably fastened with fastening members to the drum 11 at a respective end thereof. Each of the support members 35,36 includes a centrally-disposed aperture 37,38 extending therethrough with the aperture 37,38 being adapted to receive the shaft 24 therethrough. Each support member 35,36 further includes a bearing member 41,42 securely and conventionally attached to a side of the support member 35,36 and is in alignment with the aperture 37,38 and also includes a bracket member 39,40 securely and integrally attached to an upper portion of the side essentially facing the disc brake member 25. The means for braking the disc brake member 25 also includes a pair of electro-magnetic members 29 each of which is securely and conventionally mounted to the bracket member 39,40 of a respective support member 35,36 and is adapted to brake the disc brake member 25 by magnetizing the disc brake member 25 when the electro-magnetic members 29 are energized; and further includes power cords 33 conventionally attached to the electro-magnetic members 29 with the electro-magnetic members 29 being proximately spaced from either of the sides of the disc brake member 25. The means for braking the disc brake member 25 further includes a pair of arm mounting brackets 44 securely and conventionally attached to an interior of the drum 11; and also includes a pair of arm members 30 each of which is pivotally attached to a respective one of the arm mounting brackets 44 and is proximately spaced and adjacently disposed to a respective side of the disc brake member 25; and further includes a pair of pad members 31 each of which is securely and conventionally attached at an end portion of a respective arm member 30 and is engageable to the disc brake member 25; and also includes a linkage member 43 conventionally connected to the arm members 30 for the pivoting thereof; and further includes a cable 32 conventionally connected to the linkage member 43 for actuating and moving the linkage member 43. Each of the bracket members 39,40 mounted to a respective the support member 35,36 includes a first portion which extends perpendicular to the support member 35,36 and also includes a second portion which is angled relative to the first portion and which is disposed essentially parallel to the support member 35,36. The disc brake member 25 is rotatably disposed between the electro-magnetic members 29.

In use, to brake the vehicle or, in particular, the shaft 24, the electro-magnetic members 29 are energized and magnetized from the power source of the vehicle which attracts the adjacently-disposed disc brake member 25 thus braking and slowing the rotation of the disc brake member 25 which causes the shaft 24 to also brake and slow accordingly. In an emergency, the user can actuate the cable 32 which, in turn, causes the arm members 30 to pivot toward the disc brake member 25 with the pad members 31 engaging and braking the disc brake member 25.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle brake assembly comprising:
    a drum having spaced openings defining a bore extending through said drum;
    a means for securing said drum in a vehicle;
    a shaft rotatably extending through said drum;
    a disc brake member having a pair of sides and a centrally-disposed opening therethrough and being mounted about said shaft for rotation therewith and being disposed within said drum and having a plurality of holes extending therethrough; and
    means for braking said disc brake member;
        wherein said drum includes a first member having a first side facing said disc brake member and a second member also having a first side facing said disc brake member, said first and second members being mirrored images of one another, each of said spaced openings extending through one of said first and second members.

2. A vehicle brake assembly as described in claim 1, wherein said means for braking said disc brake member includes a pair of support members each of which is securely and removably fastened with fastening members to said drum at a respective said end thereof, and each of which includes a centrally-disposed aperture extending therethrough, said aperture being adapted to receive said shaft therethrough, each of said support members further including a bearing member securely attached to a side of said support member and being in alignment with said aperture and also including a bracket member securely and integrally attached to an upper portion of said side thereof, said side of each of said support members essentially facing said disc brake member.

3. A vehicle brake assembly as described in claim 2, wherein said means for braking said disc brake member includes a pair of electro-magnetic members each of which is securely mounted to said bracket member of a respective said support member and being adapted to brake said disc brake member by magnetizing said disc brake member when said electro-magnetic members are energized; and further includes power cords attached to said electro-magnetic members.

4. A vehicle brake assembly as described in claim 3, wherein said electro-magnetic members are proximately spaced from either of said sides of said disc brake member.

5. A vehicle brake assembly as described in claim 3, wherein said disc brake member is rotatably disposed between said electro-magnetic members.

6. A vehicle brake assembly as described in claim 2, wherein each of said bracket members mounted to a respective said support member includes a first portion which extends perpendicular to said support member and also includes a second portion which is angled relative to said first portion and which is disposed essentially parallel to said support member.

7. A vehicle brake assembly as described in claim 1, wherein said drum includes a first member having a first side facing said disc brake member and a second member also having a first side facing said disc brake member, said first and second members being mirrored images of one another, said openings extending through said first and second members.

8. A vehicle brake assembly as described in claim 7, wherein said means for securing said drum in a vehicle includes a pair of hub members each of which includes a bore extending therethrough and includes an annular flange for being in contactable relationship with a respective said end of said drum, said hub members being mounted about said shaft for holding said first and second members in contactable relationship to one another.

9. A vehicle brake assembly as described in claim 1, wherein said shaft is adapted to securely attach to an axle of the vehicle and includes means for securely attaching said shaft to an axle of the vehicle.

10. A vehicle brake assembly as described in claim 9, wherein said means for securely attaching said shaft to an axle of the vehicle includes a pair of yoked members integrally attached to ends of said shaft.

11. A vehicle brake assembly as described in claim 1, wherein said means for braking said disc brake member further includes a pair of arm mounting brackets securely attached to an interior of said drum; and also includes a pair of arm members each of which is pivotally attached to a respective one of said arm mounting brackets and is proximately spaced and adjacently disposed to a respective said side of said disc brake member; and further includes a pair of pad members each of which is securely attached at an end portion of a respective said arm member and is engageable to said disc brake member; and also includes at least one linkage member connected to said arm members for the pivoting thereof; and further includes a cable connected to said at least one linkage member for actuating and moving said at least one linkage member.

12. A vehicle brake assembly as described in claim 1, wherein said means for breaking said disc brake member includes a plurality of mounting members being securely attached to said first sides of said first and second members; and also includes a plurality of electro-magnetic members each of which is securely mounted to a respective one of said mounting members, and further includes a plurality of arm members pivotally attached to one of said first sides, and also includes a plurality of pad members each of which is securely attached to an end of a respective one of said arm members and being adapted to engage said disc brake member; and further includes a power cord connected to said electro-magnetic members for the energizing thereof; and also includes a cable connected to said arm members for the actuation thereof.

13. A vehicle brake assembly as described in claim 1, wherein said means for securing said drum in a vehicle includes a drum mounting bracket being securely attached to an exterior of a wall of said drum for mounting said drum to a vehicle, said drum mounting bracket includes a first portion and a second portion which is angled relative to said first portion.

14. A vehicle brake assembly comprising:
    a drum having spaced openings defining a bore extending through said drum;
    a means for securing said drum in a vehicle;
    a shaft rotatably extending through said drum;
    a disc brake member having a pair of sides and a centrally-disposed opening therethrough and being mounted about said shaft for rotation therewith and being disposed within said drum and having a plurality of holes extending therethrough; and
    means for braking said disc brake member, said drum including a first member having a first side facing said disc brake member and a second member also having a first side facing said disc brake member, said first and second members being mirrored images of one another, said openings extending through said first and second members, said means for securing said drum in a vehicle including a pair of hub members each of which includes a bore extending therethrough and including an annular flange for being in contactable relationship with a respective said end of said drum, said hub members being mounted about said shaft for holding said first and second members in contactable relationship to one another, said means for braking said disc brake member including a plurality of mounting members being securely attached to said first sides of said first and second members; and also including a plurality of electro-magnetic members each of which is securely mounted to a respective one of said mounting members, and further including a plurality of arm members pivotally attached to one of said first sides; and also including a plurality of pad members each of which is securely attached to an end of a respective one of said arm members and being adapted to engage said disc brake member; and further including a power cord connected to said electro-magnetic members for the energizing thereof; and also includes a cable connected to said arm members for the actuation thereof.

15. A vehicle brake assembly comprising:
    a drum having spaced openings defining a bore extending through said drum;
    a means for securing said drum in a vehicle;
    a shaft rotatably extending through said drum;
    a disc brake member having a pair of sides and a centrally-disposed opening therethrough and being mounted about said shaft for rotation therewith and being disposed within said drum and having a plurality of holes extending therethrough; and
    means for braking said disc brake member, said means for securing said drum in a vehicle including a drum mounting bracket being securely attached to an exterior of a wall of said drum for mounting said drum to a vehicle, said drum mounting bracket including a first portion and a second portion which is angled relative to said first portion, said shaft being adapted to securely attach to an axle of the vehicle and including means for securely attaching said shaft to an axle of the vehicle, said means for securely attaching said shaft to an axle of the vehicle including a pair of yoked members integrally attached to ends of said shaft, said means for braking said disc brake member including a pair of support members each of which is securely and removably fastened with fastening members to said drum at a respective said end thereof, and each of which includes a centrally-disposed aperture extending therethrough, said aperture being adapted to receive said shaft therethrough, each said support members further including a bearing member securely attached to a side of said support member and being in alignment with said aperture and also including a bracket member securely and integrally attached to an upper portion of said side thereof, said side of each of said support members essentially facing said disc brake member, said means for braking said disc brake member also including a pair of electro-magnetic members each of which is securely mounted to said bracket member of a respective said support member and being adapted to brake said disc brake member by magnetizing said disc brake member when said electro-magnetic members are energized; and further including power cords attached to said electro-magnetic members, said electro-magnetic members being proximately spaced from either of said sides of said disc brake member, said means for braking said disc brake member further including a pair of arm mounting brackets securely attached to an interior of said drum; and also including a pair of arm members each of which is pivotally attached to a respective one of said arm mounting brackets and is proximately spaced and adjacently disposed to a respective said side of said disc brake member; and further including a pair of pad members each of which is securely attached at an end portion of a respective said arm member and is engageable to said disc brake member; and also including at least one linkage member connected to said arm members for the pivoting thereof; and further including a cable connected to said at least one linkage member for actuating and moving said at least one linkage member, each of said bracket members mounted to a respective said support member including a first portion which extends perpendicular to said support member and also including a second portion which is angled relative to said first portion and which is disposed essentially parallel to said support member, said disc brake member being rotatably disposed between said electro-magnetic members.

* * * * *